United States Patent [19]
Carter

[11] Patent Number: 5,891,711
[45] Date of Patent: Apr. 6, 1999

[54] BIOREMEDIATION APPARATUS FOR THE REMOVAL OF VOLATILE ORGANIC COMPOUNDS IN HYDROCARBON CONTAMINATED VAPORS

[75] Inventor: Sean R. Carter, Lawtons, N.Y.

[73] Assignee: Matrix Environmental Technologies, Inc., Orchard Park, N.Y.

[21] Appl. No.: 754,016

[22] Filed: Nov. 20, 1996

Related U.S. Application Data

[63] Continuation-in-part of Ser. No. 477,090, Jun. 7, 1995, abandoned.

[51] Int. Cl.⁶ ................................................ C12M 1/04
[52] U.S. Cl. ................................. 435/299.1; 435/294.1; 435/266
[58] Field of Search ................................. 435/266, 286.5, 435/290.1, 294.1, 297.1, 297.2, 299.1, 289.1; 422/122, 171; 55/494; 96/131, 132; 248/346.01

[56] References Cited

U.S. PATENT DOCUMENTS

| | | | |
|---|---|---|---|
| 1,386,443 | 8/1921 | Steere | 55/494 |
| 3,407,045 | 10/1968 | Temple | 422/171 |
| 4,086,167 | 4/1978 | Tapola et al. | 210/150 |
| 4,379,050 | 4/1983 | Hess et al. | 210/151 |
| 4,396,507 | 8/1983 | Grant | 210/150 |
| 4,880,452 | 11/1989 | Sublette | 210/611 |
| 4,963,166 | 10/1990 | Hoyt et al. | 96/132 |
| 5,015,451 | 5/1991 | Holter et al. | 423/235 |
| 5,032,261 | 7/1991 | Pyper | 210/137 |
| 5,046,451 | 9/1991 | Inslee et al. | 119/3 |
| 5,050,676 | 9/1991 | Hess et al. | 166/267 |
| 5,064,763 | 11/1991 | Bentz | 435/266 |
| 5,082,475 | 1/1992 | Bentz | 55/68 |
| 5,126,042 | 6/1992 | Malone | 210/150 |
| 5,160,620 | 11/1992 | Lygren | 210/608 |
| 5,172,764 | 12/1992 | Hajali et al. | 166/267 |
| 5,221,159 | 6/1993 | Billings et al. | 405/128 |
| 5,595,910 | 1/1997 | Kant et al. | 435/289.1 |
| 5,635,394 | 6/1997 | Horn | 435/266 |

FOREIGN PATENT DOCUMENTS

| | | | |
|---|---|---|---|
| 1047295 | 12/1953 | France | 422/311 |
| 1155259 | 4/1958 | France | 96/131 |
| 157 | of 1885 | United Kingdom | 55/494 |

OTHER PUBLICATIONS

Biofiltration: An Innovative air Pollution Control Technology for VOC Emissions, Gero Leson and Arthur M. Winer. J. Air Waste Management Assoc.; 1045–1054 (1991).
Biofilters and Biosolids. Parviz Amirhor et al. Water Environment and Technology; 44–48 (Mar. 1995).
Biofiltration Holds VOC's Odors at Bay. Kannan Vembu and C. Stow Walker. Environmental Protection; 27–29, 58 (Feb. 1995).
Treatment of Hydrocarbon Fuel Vapors in Biofilters. Douglas Hodge et al. Environmental Technology, vol. 2, 655–662. (1991).
E G & G, Inc. Biofiltration System Brochure dated Sep. 1994.

*Primary Examiner*—William H. Beisner
*Attorney, Agent, or Firm*—Cumpston & Shaw

[57] ABSTRACT

A bioremediation apparatus for removal of volatile organic compounds (VOC's) from a contaminated air stream generated from the subsurface remediation of hydrocarbon contaminated ground water and soil is described. The apparatus includes an above ground multilevel biofilter which holds a biologically active media at each level, the levels forming a stack of interlocked levels in series such that the media in each level does not directly contact the media in the adjacent levels. The biofilter includes, a perforated support plate having a multiplicity of holes, the holes having a maximum diameter sufficiently small to prevent significant amounts of the bioactive media from passing there through and a minimum diameter sufficiently large to prevent clogging, the spacing between adjacent holes being selected to produce an overall ratio of total hole area to total plate area of between from about 20% to about 35%.

27 Claims, 6 Drawing Sheets

BIOREMEDIATION APPARATUS FOR THE REMOVAL OF VOLATILE ORGANIC COMPOUNDS IN HYDROCARBON CONTAMINATED VAPORS

This application is a continuation-in-part, of application Ser. No. 08/477,090, filed Jun. 7, 1995, now abandoned.

FIELD OF THE INVENTION

This invention relates generally to a bioremediation apparatus for removal of volatile organic compounds (VOC's) from subsurface soil and ground water in which biological oxidation of VOC's is used to convert the contaminants into carbon dioxide, water and additional microorganisms by a biofiltration process, and in particular to an apparatus having a plurality of perforated plates for supporting the bioactive media.

BACKGROUND OF THE INVENTION

The process of VOC destruction is called biofiltration, biodegradation, bioremediation, biotransformation and/or biooxidation. It is mainly carried out by two types of microorganisms, heterotrophic bacteria and fungi. Biodegradation is an enzymatic process whereby enzymes produced by the microorganisms catalyze the breakdown of the VOC's into carbon dioxide and water. The VOC's, in particular hydrocarbons, may or may not be used as an energy source to produce additional microorganisms. The process of biodegradation whereby a co-substrate is added to provide a source of carbon and energy for bacterial growth is called cometabolism. In a biofilter the microorganisms grow on materials such as soil, compost, peat or heather, supplemented sometimes with synthetic materials, including activated carbon and polystyrene, which provides structure stability.

Subsurface contamination of ground water and soil results from the release of petroleum products and industrial chemicals due to leaking aboveground and underground storage tanks, piping, pumps, and/or dispensers. Leakage also results from human error and acts of nature. In the case of petroleum products, subsurface contamination is often encountered at retail gasoline facilities, bulk storage terminals, transfer stations, pipelines, and refineries. Due to environmental regulations, the remediation of ground water and soils has become necessary in the petroleum industry. Subsurface remediation for the most part involves three basic processes: the extraction of fluids for treatment above ground, the injection of fluids for treatment in situ, or a combination of both. Technologies available to accomplish these processes include treatment via physical, chemical or biological methods, many of which produce a vapor or air stream requiring further treatment for regulatory compliance.

One of the most common remediation technologies involves the extraction of vapors from the unsaturated or vadose zone of the subsurface. Following the subsurface release of a volatile product like gasoline, vapors accumulate in the void spaces found in soil which are not filled with water. These vapors are extracted through vertical or horizontal slotted pipes with the use of a vacuum pump or similar device. As these vapors are removed volatilization of the product is enhanced resulting in continued vapor production. This process is called soil vapor extraction or soil venting.

A similar vapor producing process involves applying a vacuum to a vertical slotted pipe extending into the water table (i.e. ground water recovery well) simultaneously with ground water pumping. This technique not only results in venting of the vadose zone but also increases the volatilization of free phase hydrocarbons (i.e. product) floating on the ground water table and increases the recovery rates of ground water and product via pumping. This process is called vacuum enhancement.

A third vacuum technology involves the simultaneous extraction of ground water, vapor, and product from numerous vertical slotted pipes extending into the water table using a high vacuum extraction pump. This technique allows total phase extraction of fluids with one pump via many extraction points and at rates significantly higher than conventional pumping methods. Extracted fluids (i.e. water and vapor) are separated at the surface for further treatment with other processes.

Due to the regulated discharge of VOC's to the atmosphere, treatment of contaminated air streams from vapor extraction is required in most regions. Several types of air treatment systems are used in subsurface remediation including carbon adsorption, thermal combustion, catalytic oxidation and biofiltration. The use of these air treatment systems depend on the types and concentrations of contaminants, the air flow rates and the availability of energy. Thermal combustion and catalytic oxidation systems require energy input to operate. Both of these systems result in the destruction of VOC's but require high concentrations of VOC's in the air stream to be economically feasible. Carbon adsorption or carbon filtration involves passing the air stream through a vessel containing activated carbon where VOC's are adsorbed and retained. Once the carbon is saturated with VOC's it can be regenerated with thermal treatment or stored as a solid waste. Biofiltration differs from the other treatment processes because it results in VOC destruction with minimal energy input, is a regenerative process, and does not result in by-products requiring further treatment or disposal.

The basic components of a biofiltration system are a bed of filter material and a piping system that distributes the VOC's into the filter, a blower or vacuum source to propel the gas through the system and pre treatment devices for humidifying the gases and, where necessary, removing particulates.

Compost, usually produced from municipal waste, wood chips, bark or leaves has generally been the basis of filter material. Open single-bed systems and open multilevel systems are inexpensive and relatively easy to maintain and have large space requirements. However, enclosed systems, usually with stacked beds are appropriate where minimum maintenance is required and where space constraints prohibit the installation of a single-bed filter. The useful life for the filter material is up to about five years. Compaction of the compost can lead to back pressure and typically the compost needs to be turned over or eventually replaced. Drying of the filter material renders it biologically inactive and requires replacement of the compost.

The type of construction and installation of a biofilter for a given application will depend primarily on the availability of space relative to the required filter volume.

It is an object of this invention to provide a bioremediation apparatus for removing volatile organic compounds (VOC's) from air streams which includes a multilevel stacked biofilter which holds biofilter media at each level but does not directly contact media in the level above or below.

It is another object of this invention to provide a biologically active media to adsorb the VOC's resulting in their biodegradation to carbon dioxide and water.

It is another object of this invention to provide a biofilter in which each level is divided into lower and upper chambers by a perforated support plate which retains media but allows the passage of air and water vapor with minimal resistance.

It is another object of this invention to provide a multilevel biofilter in which each perforated plate is reinforced to support the weight of the media.

It is another object of this invention to provide a multilevel biofilter in which there is a void space between the media levels to isolate the levels into distinct treatment zones.

It is another object of this invention to provide a biofilter which allows access to media at each level for monitoring and sampling.

It is another object of this invention to provide a bioremediation apparatus which humidifies dry air and cools hot air prior to contacting the media.

It is another object of this invention to provide a bioremediation apparatus which is operated under a slight vacuum to cause the downward flow of air and water vapor through the media.

SUMMARY OF THE INVENTION

Briefly stated the present invention describes a bioremediation apparatus for removal of volatile organic compounds (VOC's) from a contaminated air stream generated from the subsurface remediation of hydrocarbon contaminated ground water and soil comprising an above ground multilevel biofilter which holds a biologically active media at each level, the levels forming a stack of interlocked levels in series such that the media in each level does not directly contact the media in the adjacent levels, the biofilter comprising:

a cover having a top plate, a side wall with top and bottom edges extending below the perimeter of the plate, and an inlet pipe boss in the wall for introducing the air stream;

one or more media containers located below the cover divided into upper and lower chambers by a perforated support plate having a center opening there through, the support plate supporting a quantity of the media, the container further comprising; a side wall with top and bottom edges surrounding the chambers, a first wall reinforcing bar around the inside top edge of the container wall, a first connecting plate attached under the center of the support plate, a framework of interconnected bars attached between the lower chamber wall, the support plate and the first connecting plate for reinforcing the support plate, and a center upstanding support post attached to the first connecting plate for supporting an adjacent container; and a bottom level media container located below the stack of one or more containers divided into upper and lower chambers by a perforated support plate, having a center opening there through, the bottom container support plate supporting a quantity of the media, the bottom level container further comprising; a basin plate attached to the bottom of the bottom level lower chamber, a side wall with top and bottom edges extending upward from the basin plate and surrounding the bottom container chambers, an outlet pipe boss in the bottom container lower chamber wall for exhausting the filtered air stream, a first wall reinforcing bar around the inside top edge of the bottom container wall, a first connecting plate attached to the center of the bottom container support plate, a framework of interconnected bars attached between the bottom container lower chamber wall, the bottom container support plate and the bottom container first connecting plate for reinforcing the bottom container support plate, a center connecting plate below the bottom container first connecting plate attached to the bottom container framework, a first center upstanding support post attached to the bottom container first connecting plate for supporting an adjacent container, and a second upstanding support post connected to the center of the basin plate for bearing against the bottom container center connecting plate;

whereby the depth of the framework of the one or more media containers creates a void space between the media levels which isolates the levels into a number of distinct treatment zones.

In another aspect of the invention the bioremediation apparatus includes a perforated support plate having a multiplicity of holes, the holes having a maximum diameter sufficiently small to prevent significant amounts of the bioactive media from passing there through and a minimum diameter sufficiently large to prevent clogging, the spacing between adjacent holes being selected to produce an overall ratio of total hole area to total plate area of between from about 20% to about 35%.

DETAILED DESCRIPTION OF THE INVENTION

The present invention is directed to a bioremediation apparatus for removing volatile organic compounds (VOC's), by the process of biological oxidation, from air streams produced from the subsurface remediation of hydrocarbon contaminated ground water and soil. Small scale remediation efforts like those found at gasoline retail stations, typically involve treatment of air streams moving at less than 200 cfm. The VOC's of concern which require treatment are the purgeable aromatic hydrocarbons, including benzene, toluene, ethyl benzene, and xylenes (BTEX).

Compost, usually produced from municipal waste, wood chips, bark or leaves, is a nutrient rich finished compost which contains microorganisms capable of degrading petroleum hydrocarbons under aerobic conditions, and is the basis of the filter media. Adsorption of the VOC's onto the biologically active media results in oxidation of the hydrocarbon materials into carbon dioxide and water by the microorganisms, and the growth and maintenance of the microorganisms. The moisture content of a compost is preferably from about 40% to about 60% by weight of water. Such a self-sustaining media can have a life of up to about 5 years. Pine bark nuggets are preferably used as the bulking agent to promote flow of the air stream through the media without creating back pressure. Back pressure can also be caused by high blower rates or high vacuum conditions resulting in channeling and compaction of the compost, and leakage of the air stream. Filter particle size distribution and pore structure should provide large reactive surfaces and low pressure drops. Compaction should be kept to a minimum, reducing the need for maintenance and replacement of the filter material. Maintaining the porosity of the compost while avoiding channeling over the life of the compost are important for efficient biofiltration operation and to reduce maintenance costs. Preferably the contact time of volatile hydrocarbon contaminants (VOC's) with the bioactive media is at least 30 seconds so that the contaminants remain in contact with the bioactive media for long enough to undergo essentially complete biodegradation.

A consistent moisture level is essential for biofilter effectiveness. The microorganisms require a moist environment and blowing gas through a damp filter material has a drying effect. Preferably the moisture content of the media should be maintained between from about 40% to about 60% by weight. Biofiltration systems operate best between 30° and 40° C. and systems need to include methods for controlling temperature levels.

Operating temperatures as low as about 10° C. are possible. Most microorganisms prefer a specific pH range. The pH in compost filters is typically between 7 and 8. In some cases the biodegradation of air pollutants can generate acidic by-products. In such cases chemical buffers, such as lime, are added. Crushed limestone is preferably added to maintain a neutral pH in the media. A neutral pH also reduces corrosion of metallic components of the biofilter.

The type of construction and installation of a biofilter for a given application will depend primarily on the availability of space relative to the required filter volume. For an enclosed system provision is made for ready access to and removal of the filter material if required. Provision for temperature, humidity and pH controls are advisable. For relatively small contaminated areas it is desirable that the apparatus be constructed of materials and arranged in a configuration to be portable and durable, and which can be insulated for outdoor operation or contained in a building or mobile enclosure. The materials and design of a multilevel biofilter should be such that light weight materials can be used while maintaining structural integrity under the weight of multiple layers of biofilter materials.

Figure 1:
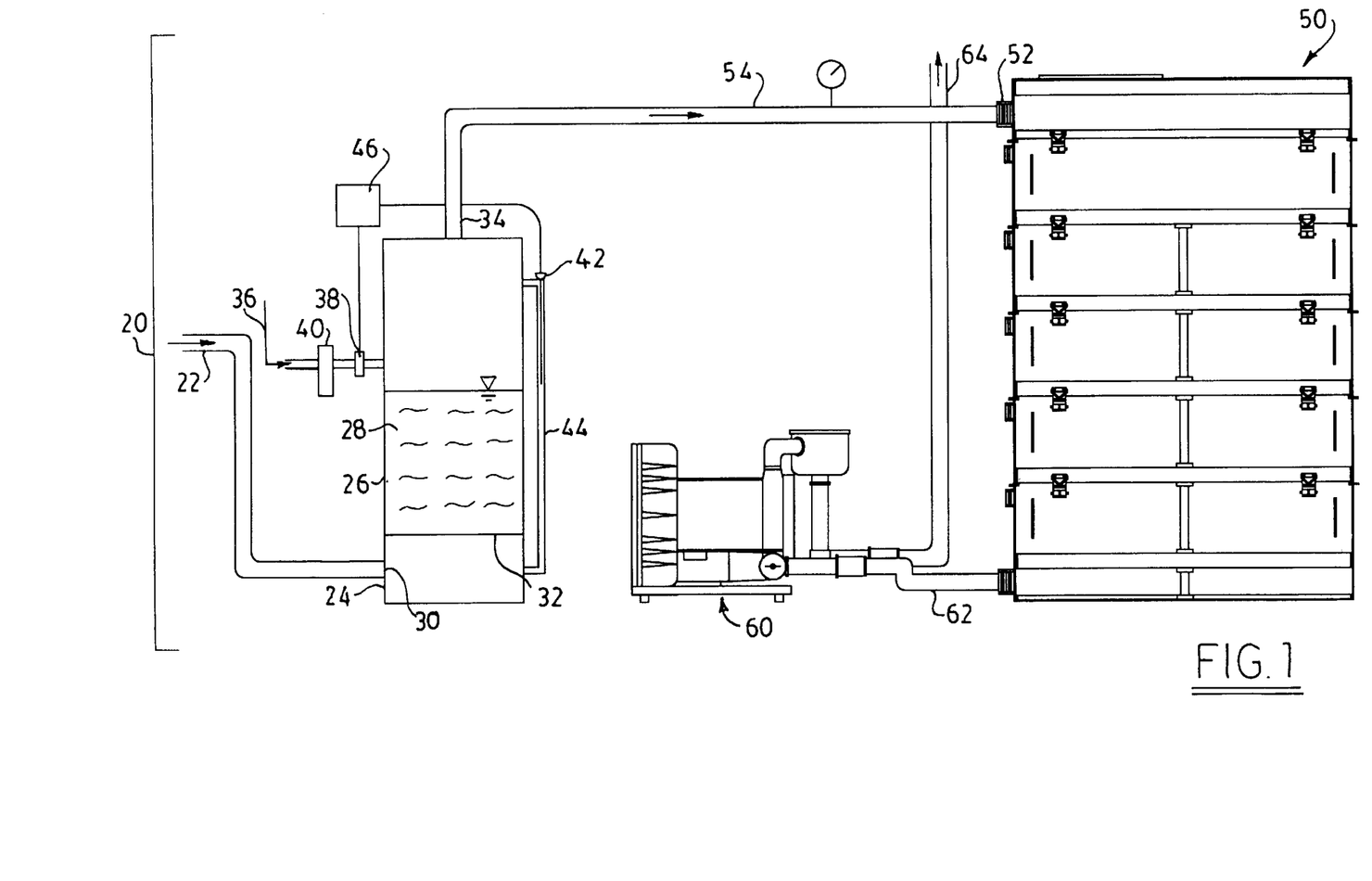
FIG. 1 is an illustration of an apparatus for removal of volatile organic compounds from a contaminated air stream.

Referring to FIG. 1 there is illustrated a bioremediation apparatus 20 of the invention for removing VOC's from a contaminated air stream. Contaminated air is discharged from the pressure side of a vacuum pump or similar extraction apparatus and travels through a pipe 22 constructed of polyvinyl chloride, steel or similar material. The air enters the bottom side 24 of a steel, high density plastic or aluminum tank 26 containing water 28 through a welded coupling 30. Near the bottom of the tank the air must pass through a sheet of perforated material, preferably aluminum, 32 which is welded to the sides of the tank below the water level. The aluminum sheet is perforated with holes resulting in an open area. The open area is preferably between about 20 to 35 percent. This perforated sheet acts as a diffuser to break up the incoming air into finer bubbles.

This technique was chosen because it results in minimal back pressure on the vacuum pump, provides the diffusion needed for humidification of dry air to 100% relative humidity, and is easy to clean with a pressure washer to remove chemical precipitates and/or other deposits commonly encountered in ground water. The humidified air exits the top of the tank through a welded coupling 34 which is located at the opposite end from the entrance port.

The water supply to the tank is through a pressure water line 36 connected to a solenoid valve 38 located at the half way point of one side of the tank. The water source can be ground water, surface water or supplied water. Prior to entering the solenoid valve the water is passed through a cartridge type filter housing 40 containing either a sediment or carbon filter cartridge to remove particulate matter and/or chlorine. The water level in the tank is regulated by a conductivity sensor 42 located in an external pipe 44, for example a PVC pipe, in the vertical position connected to the tank through ports near the top and bottom. Liquid level controls external to the tank are used because the turbulence in the tank interferes with the sensors ability to correctly determine the water level and the sensor is easily accessible for cleaning to remove chemical precipitates and/or other deposits. The position of the sensor can be moved to control the water level in the tank. When water touches the sensor a signal is sent via a control unit 46 to close the solenoid valve. A signal delay up to 30 seconds is built into the controls to prevent constant opening and closing of the solenoid valve.

The humidified air enters the top level of the biofilter 50 through a welded coupling 52 on the side and flows downward through the five media levels. The pipe 54 from the humidifier to the biofilter is PVC, steel or similar material. A regenerative vacuum pump 60, for example 2.5 hp, draws a vacuum of 20 to 25 inches of water column (w.c.) on the bottom level of the biofilter through a pipe 62. This maintains a 5 in. w.c. or less vacuum on the pipe 54 leading into the biofilter which results in even flow distribution through the five media levels. Keeping a vacuum on the biofilter also prevents excessive back pressure on the system producing the air stream. The purified air stream is exhausted through a pipe 64 and discharged into the atmosphere. Air couplers and a vacuum pump, for example 0.5 hp, are used to draw air samples from the pre- and post-biofilter vacuum lines for gas analysis. Plugged sample ports on the pre-humidifier and pre- and post-biofilter lines are used to measure humidity, temperature and air velocity in the pipes.

The humidifier also serves to decrease the temperature of the air stream which has been elevated due to passage through the vacuum pumps used to extract the air stream from the ground. The temperature of the air stream is preferably reduced below about 40° C. It is another advantage of this invention that it is not necessary to pre heat the air stream in colder regions since the equipment used provides sufficient heat to the air stream to maintain operating temperatures. Insulation of the biofilter is usually sufficient under the severest temperature fluctuations to maintain operating temperatures between about 10° and 40° C. The biofilter can be insulated by coating, for example by spray coating, the outside with one or more layers of polyurethane foam.

The biofilter preferably has a circular or cylindrical configuration for better air flow. However, other configurations of the biofilter, for example, rectangular or octagonal can be used.

Referring now to FIGS. 2–7 a preferred embodiment of the biofilter 50 is illustrated in greater detail. The cylindrical biofilter, FIG. 2, has a top cover 70, a top level container 72, identical intermediate level containers 74, 76, 78 and a bottom level container 80. The biofilter is preferably of circular construction. The biofilter is constructed of light weight materials and arranged in a configuration to be portable and durable. The biofilter can be skid-mounted and insulated for example, with polyurethane, for outdoor operation. The skid is of heavy duty construction, for example steel, and allows moving of the biofilter with appropriate machinery.

Figure 3:
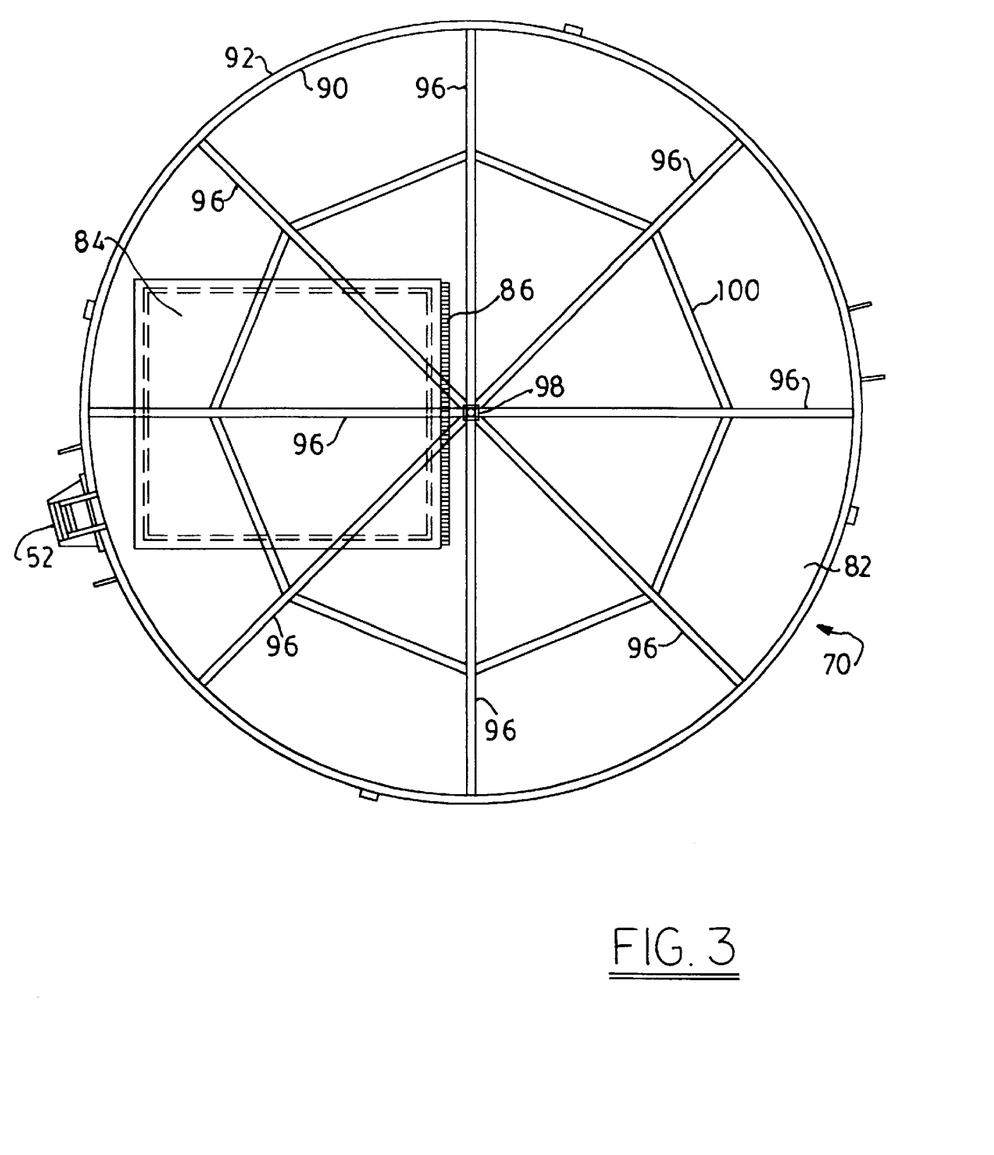
FIG. 3 is a section view of the biofilter cover and support framework.
Figure 4:
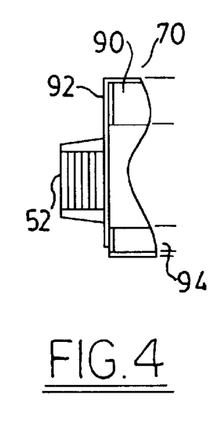
FIG. 4 is a front section view of the biofilter top cover.

Referring to FIGS. 3 and 4, the top cover 70 includes a circular plate 82 and is provided with a hatch 84 in the cover plate for accessing the media below. The hatch is provided with hinges 86 and a latch for opening and closing the hatch. This provides easy access for loading and unloading the top level and, subsequently, access to the lower levels by removal of the top level, thus maintenance of the biofilter is readily accomplished. The cover is provided with an inlet pipe boss 52 for introducing the air stream. The cover is preferably reinforced to bear the weight of an operator carrying out maintenance or loading operations through the hatch. In a preferred embodiment the cover has a first reinforcing ring 90 around the inside top edge of the wall 92 below the cover plate 82. A second reinforcing ring 94 is positioned around the inside of the bottom edge of the wall. The cover is reinforced by a plurality of spoke bars 96 extending radially from the center of the cover plate to the ring 90. The spoke bars are preferably rectangular and extend downward partially toward the bottom of the wall. The upper edge of one end of each spoke bar is connected, preferably welded, to a center located first square plate 98 which is welded to the cover plate and the bottom edge is welded to a second square plate located beneath the first square plate. Thus the bars are sandwiched between the square plates. The other end of each spoke bar is welded to the first reinforcing ring 90. A rib bar 100, preferably rectangular shaped, connects each spoke bar to an adjacent spoke bar at a point about midway between the center and the first ring. The rib bars are preferably welded to the spoke bars. The cover is also welded at various points along the top of each bar and along the top edge of the support ring. The bottom edge of the cover wall is provided with a sealing ring, such as a gasoline resistant rubber seal, in the form of a male-type ring for inserting in a corresponding female-type sealing ring in the top edge of the adjoining level.

Below the top cover there is a top level circular media container 72 which is divided into an upper chamber 110 and a lower chamber 112 by a perforated circular support plate 114. Below the top container there is a stack of identical intermediate level media containers of the biofilter, 74, 76, 78, (FIG. 2) each of which is divided into upper and lower chambers, 116, 118 by a perforated circular support plate 120. The structures of the top container and the intermediate containers are identical except for a center upstanding post 122 which is present in each intermediate level and absent from the top level. The structure of the top container and the intermediate containers will be described for intermediate level 74 with reference to FIGS. 2, 5 and 6.

Figure 2:
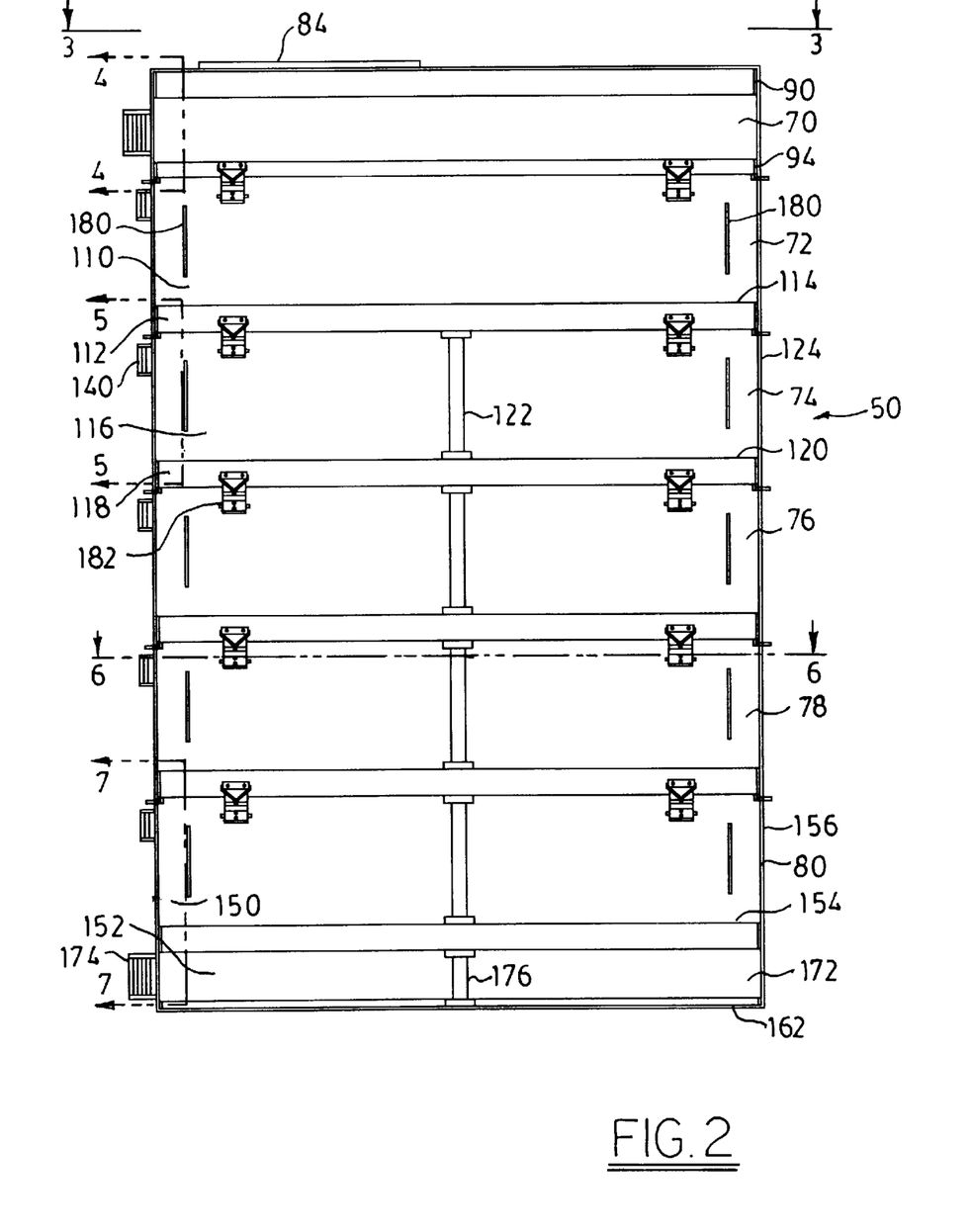
FIG. 2 is perspective view of a multilevel biofilter.
Figure 5:
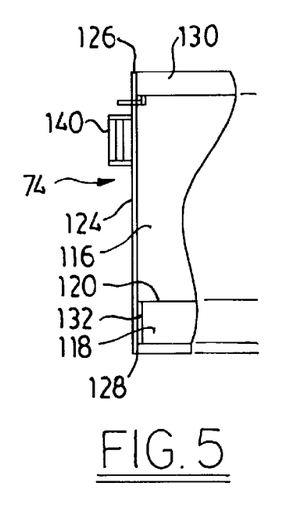
FIG. 5 is a front section view of an intermediate level container of the biofilter.
Figure 6:
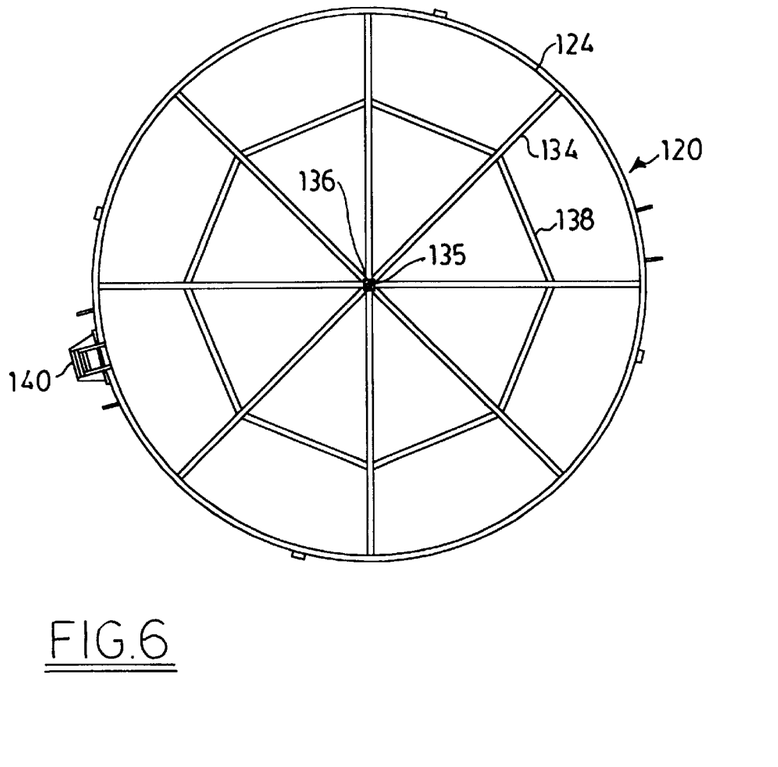
FIG. 6 is a section view of a biofilter intermediate level plate and support framework.

The support plate 120 supports a quantity of the biofilter media and is perforated with holes so that there is sufficient structure to support the media while allowing sufficient open area for passage of the air stream down through the levels without creating a back pressure or causing channeling passages in the media. The open area of the plate is preferably between about 20 to 35 percent but smaller or larger areas can be used depending on the application. Small holes prevent leakage of the media while larger holes enable air flow. The plate is preferably manufactured from non-corroding light weight materials, such as aluminum. The container is surrounded by a side wall 124 with top and bottom edges 126, 128. The wall is reinforced by a metal ring 130 inside the top edge and a metal ring 132 inside the bottom edge. The perforated plate is partially supported by the lower ring. Because the weight of the biofilter media being supported can be great the plate is supported by a framework of metal bars having a configuration designed to provide strength with a minimum increase in weight. In a preferred embodiment the perforated plate is reinforced by a plurality of spoke bars 134 extending radially from an opening 135 in the center of the cover plate to the bottom ring 132. The spoke bars are preferably rectangular and have the short side extending downward so that the lower long edge is level with the bottom edge of the wall. The upper edge of one end of each spoke bar is connected, preferably welded, to a center located first square plate 136 which is welded to the support plate 120 and the bottom edge is welded to a second square plate located beneath the first square plate. Thus the spoke bars are sandwiched between the square plates. The other end of each spoke bar is welded to the bottom reinforcing ring. A rib bar 138, preferably rectangular shaped, connects each spoke bar to an adjacent spoke bar at a point about midway between the center and the bottom ring. The rib bars are preferably welded to the spoke bars. A center upstanding support post 122 passes through the center opening 135 in the plate 120 and is welded between the first center square plate and the second center square plate of an adjacent container.

Throughout the construction of the biofilter all metal to metal connections are preferably made by welding to minimize leakage of the VOC's which could occur if screws or rivets were used.

Each media container is preferably provided with a port 140 in the upper chamber wall for accessing the chamber. The port can be used for obtaining media samples and air stream samples so that the activity of the media and the contents of the air stream can be monitored. The port can also be used to monitor the internal temperatures of the media and the air stream.

The bottom edge of the wall is provided with a sealing ring, such as a gasoline resistant rubber seal, in the form of a male-type ring for inserting in a corresponding female-type sealing ring in the top edge of the adjoining level. The top edge of the wall is provided with a sealing ring, such as a gasoline resistant rubber seal, in the form of a female-type ring for receiving a corresponding male-type sealing ring in the bottom edge of the adjoining level. A gasoline resistant rubber gasket can be inserted into the female-type ring to provide an air-tight seal. The weight of the media locks the levels in place and prevents shifting.

Figure 7:
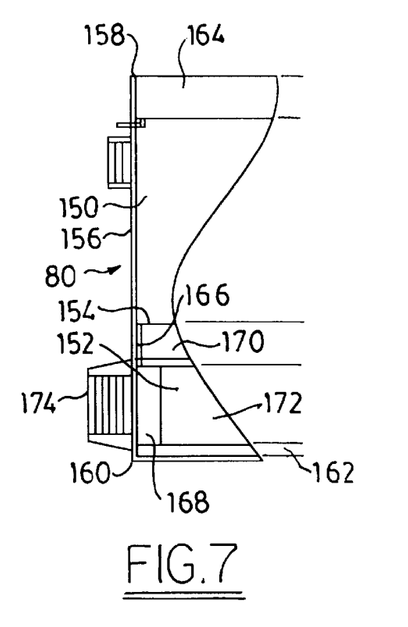
FIG. 7 is a front section view of the biofilter bottom level container.

Located below the intermediate level stack of containers is a bottom level circular container 80 which will be described with particular reference to FIGS. 2 and 7. The bottom level container is divided into upper and lower chambers 150, 152 by a perforated circular support plate 154 having a center opening there through. The container is surrounded by a side wall 156 with top and bottom edges 158, 160 respectively. The bottom of the container is enclosed by a circular basin 162 attached to the bottom edge of the wall. The side wall is reinforced with first 164, second 166, and third 168 reinforcing rings around the inside of the wall. The upper chamber is structurally similar to the upper chamber of the intermediate level containers. The perforated plate is supported, preferably, by an identical spoke and rib framework 170 as described for the intermediate level containers except that the spokes and ribs extend only partially toward the bottom of the side wall. This bottom level side wall is higher than the intermediate level side walls. Below the perforated plate and supporting structure a space 172 is provided for collecting accumulated water condensate. A second upstanding support post 176 is connected between the basin and the second connecting plate of the bottom container. An outlet pipe boss 174 is provided in the bottom container wall of the lower chamber for exhausting the filtered air stream. A drain is also provided, for example, in the lower part of the wall or in the basin bottom for draining the accumulated fluids.

Figure 8:
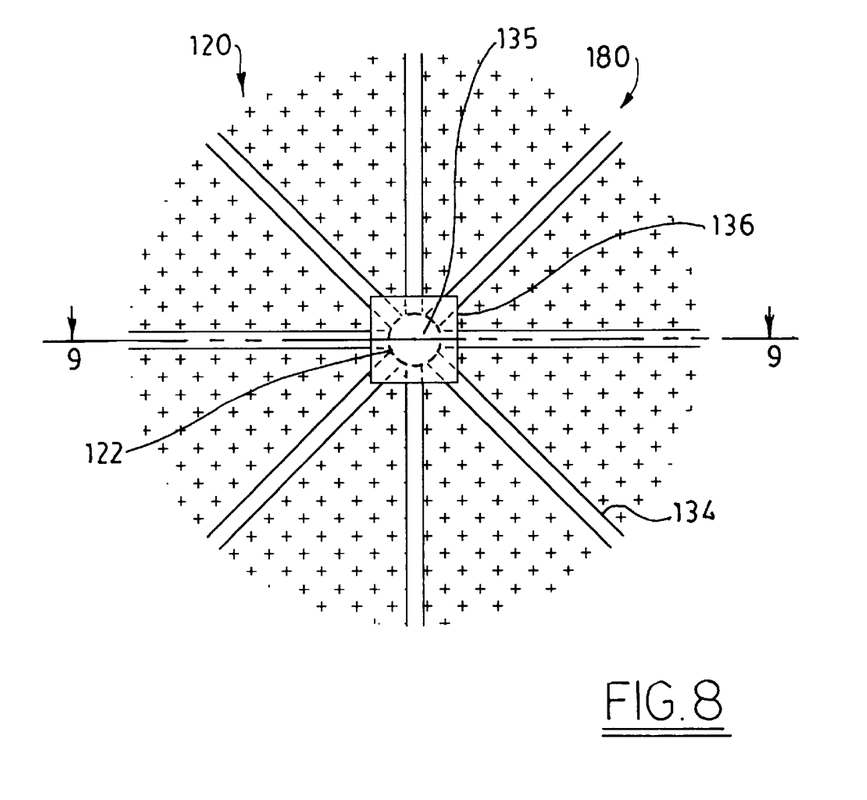
FIG. 8 is a partial view of a support framework.
Figure 9:
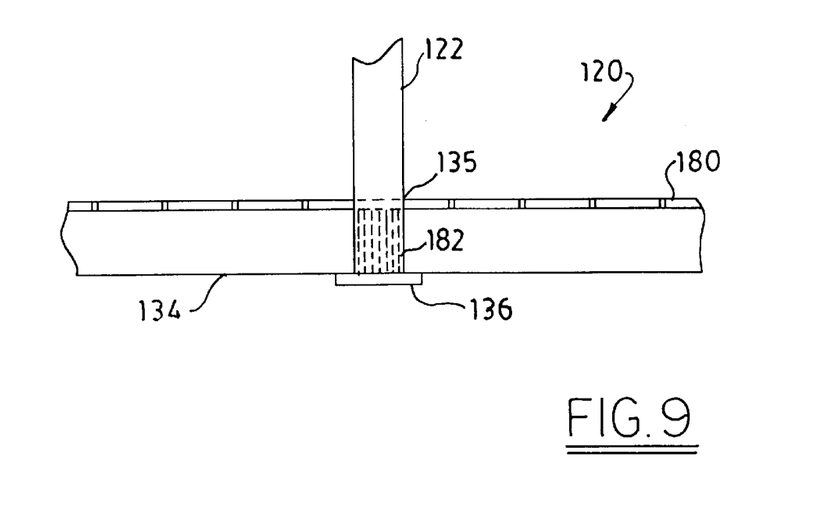
FIG. 9 is a side view of the support framework of FIG. 8.

Referring now to FIGS. 8 and 9 there is illustrated a preferred construction for the supporting framework, the connecting plate and the support post. Referring to FIG. 8, the central portion 180 of a support plate 120, as viewed from below the plate, shows the support post 122 in the center opening 135 of the support plate 120 with the spoke bars 134 connected to a single square plate 136 located below the center and welded to the bottom of the spoke bars 134. The spoke bars are welded between the support plate and the connecting plate. Referring to FIG. 9 the central portion 180 of the support plate 120 shows the post 122 disposed in the opening 135 of the support plate so that an end 182 of the post contacts the connecting plate 136 and can be welded thereto. An opposite end of the post then bears on the corresponding connecting plate of an adjacent container.

In another embodiment of the biofilter, the first connecting plate of each container can have a center opening through which the support post can pass and be attached by one end to the second connecting plate and the opposite end can bear on the second connecting plate of an adjacent container.

The wheel-like design of the support framework is light and strong thus providing a durable, strong biofilter unit while maintaining portability.

The depth of the spoke and rib bars provides a void space between the media levels which isolates the levels into a number of distinct treatment zones. This results in a redistribution of air flow between each media level and encourages the homogeneous flow of fluids through the media and the biofilter unit. Even if some channeling occurs in one level the void space captures the air stream and redistributes it to the next lower level. The combination of a relatively porous media and the perforated plates allows the passage of fluids with minimal resistance.

The monitoring ports allow monitoring of the air before and after entering the media levels to determine if the predetermined level of purification has been reached. The media can also be tested for biological activity and for compaction.

For a given bioactive media and a given flow rate of the airstream the ratio of the open area of the porous plate to the total area of the plate is critical for maintaining a homogeneous air flow through the media without short circuiting the media. For any given media the holes in the porous plate must be small enough to prevent significant amounts of the bioactive media from passing through the holes and large enough to prevent clogging by the particles of the bioactive media. Therefore, the size and pattern of the holes must be selected to prevent plugging while providing the preferred ratio for the open area of the porous plate. The preferred ratio is between from about 20% to about 35%, preferably about 27%, when a bioactive media such as a compost is used. A pattern of approximately 0.125 inch diameter holes on 0.25 inch centers on a surface area results in an open area of between from about 20% to about 35%. The holes can be any suitable shape, preferably circular.

Figure 10:
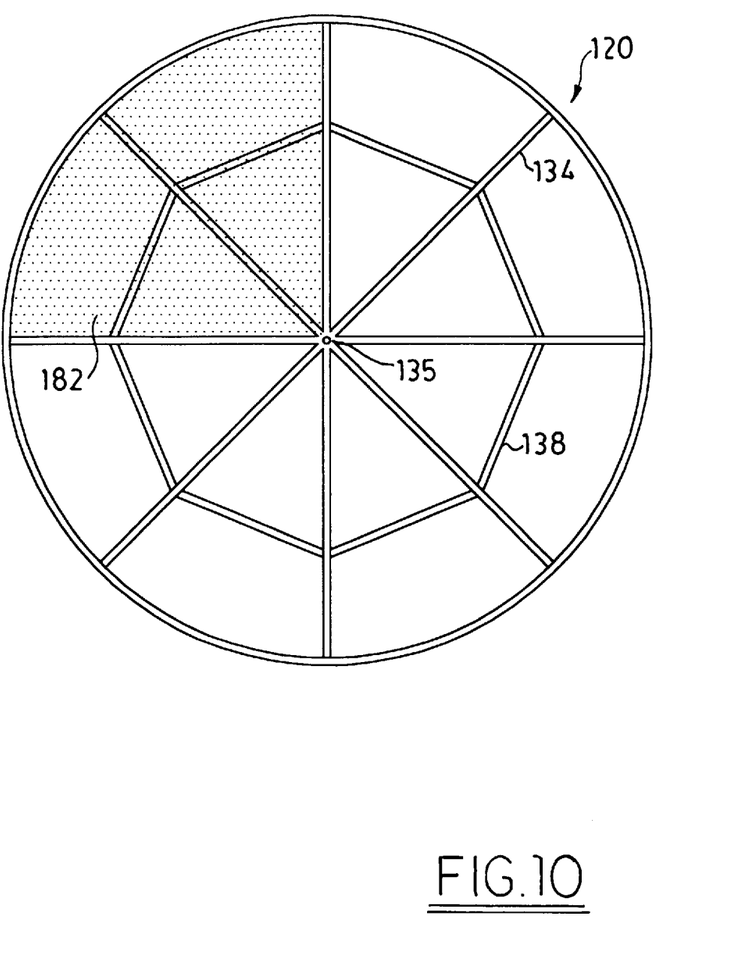
FIG. 10 is a partial view of the hole pattern of a support plate.

Referring to FIG. 10, the preferred pattern of holes 182 with 0.125 inch diameter holes on 0.25 inch centers is illustrated for a section of the plate 120. It is understood that this pattern of holes is not according to scale and is continued over the complete area of the plate to give a total open area of about 27%.

The design and overall dimensions of the biofilter apparatus are dependent upon selected design parameters. The contact time of volatile organic compounds (VOC's) with the bioactive media is critical so that the contaminants remain in contact with the bioactive media and undergo essentially complete biodegradation. The contact time is a function of the velocity of the air flow and the height of the media through which the airstream passes. The degree of compaction of the bioactive media is critical for avoiding back pressure and disrupting the homogeneous air flow through the media. For a given media, the pressure, i.e. pounds per sq. ft., exerted on the media to cause compaction is determined by the height of the layer.

It is also important that a satisfactory moisture content of the media be maintained so that the air flow velocity does not cause the drying-out of portions of the media which could result in short circuiting of the media and insufficient contact of the VOC's with the media.

For a given flow rate and a given media there is a preferred volume of media required to remove the contaminants. The layer(s) of bioactive material must be sufficiently thin so that the bioactive media does not become compacted, but remains porous to the airstream.

For a bioactive media of a given density the height of the media layer to prevent compaction is critical. The preferred height of the bioactive media layer and hence the number of bioactive layers is related to the total area of the porous plates of the apparatus.

Having one or more media layers on one or more perforated plates with supporting structures that create a void space between the layers allows the airstream to redistribute the contaminants between each layer and minimize short circuiting of the media.

The biofilter of the invention is designed to achieve a contact time of the VOC's with the preferred bioactive media of at least about 30 seconds so that the contaminants remain in contact with the bioactive media and undergo essentially complete biodegradation. Different contaminants may require slightly different contact times.

The preferred design parameters for VOC's treatment by the biofilter are:

VEL$\leq$10 ft./min.

T$\geq$0.5 min.

P$\leq$50 pounds/sq. ft.

The Design Equations for deriving the preferred dimensions of the biofilter are:

VEL=Q/A$\leq$10 or A$\geq$Q/10

A=$(\pi^* D^2)/4$ $(\pi^* D^2)/4 \geq Q/10$ or D$\geq 0.357^* Q^{0.5}$

T=V/Q$\geq$0.5 or V$\geq$Q/2

V=H$^*$ A=H$^*(\pi^* D^2)/4$

H$^*(\pi^* D^2)/4 \geq Q/2$ or H$\geq(2^* Q)/(\pi^* D^2)$ wherein:

V=volume of media, cubic feet

A=surface area of biofilter support plate, square feet

Q=air flow rate, cubic feet per minute.

VEL=velocity of air flow, feet per minute.

T=retention time in the volume of media, minutes.

D=diameter of a circular biofilter, feet.

H=height of biactive media, feet.

h=height of biofilter media container, feet.

d=density of media, pounds per cubic feet.

P=pressure from weight of media, pounds per square foot.

The parameters for a preferred circular biofilter having an air flow of about 200 cu. ft./min. are calculated as follows:

Q=200 cubic feet per minute.

$D \geq 0.357 * Q^{0.5} \geq 0.357 * 200^{0.5} \geq 5$ feet $H \geq (2*Q)/(\pi * D^2) H \geq (2*200)/(\pi * 5^2) \geq 5$ feet $P = (d * V)/A \leq 50$ or $d*h \leq 50$ $h \leq 1$ foot.

For example, a preferred circular biofilter suitable for removing VOC's flowing at 200 cu. ft/min would have a diameter of 5 feet and hold about 100 cu ft of bioactive media with an overall height of about 5 ft. Since the bioactive media compacts at a pressure of about 50 pounds per square foot, the height of the media should not be greater than about 1 foot, and thus the biofilter is preferably constructed with five containers, each container supporting 1 foot of bioactive media, separated by an air space.

In one embodiment, the biofilter of the invention is constructed of aluminum but other materials, for example, stainless-steel or high density plastic can be used. The biofilter unit measures 5 feet in diameter and 7 feet 7 in. in height. It consists of a top level which is 9⅜ in. high, 4 intermediate media levels which are 14⅞ in. high and 1 bottom media level which is 22⅛ in. high. The top level is a cover to the first media level and contains a 4 in. welded coupling on one side and a 2 foot square access hatch on the top. This hatch allows quick access to the biofilter for media sampling and monitoring. The 4 intermediate media levels are identical and consist of a layer of perforated aluminum sheeting with ⅛ in. holes on ¼ in. centers resulting in an open area of about 27%. The perforated aluminum plate is located 12 in. from the top of the level. Beneath the perforated aluminum is a support framework consisting of, for example, eight 3/16 in. by 2 in. aluminum spoke bars 2 ft. 6 in length and evenly spaced. The eight spoke bars are welded together in the center of the level with a 3/16 in. by 2 in. square plate. The spoke bars are also interconnected midway between the center and outer ring with 3/16 in. by 2 in. rib bars. The 2 in. spoke and rib bars also provide a 2 in. void space between the media levels which isolates the levels into 5 distinct treatment zones within a biofilter unit. The intermediate media levels each have a 2 in. diameter welded coupling on one side. This port is used to insert a compost thermometer, draw air samples or to obtain media samples. The bottom media level has a 7 in. basin section below the perforated level. Treated air exits the biofilter from this area through a 4 in. welded coupling on one side. The bottom section also acts as a trap for water vapor. Accumulated water is drained from the bottom. Such a biofilter can support a total of about 4,000 pounds of media, or about 750 pounds of media by each level. The space between the support plate and the top of each level is normally filled with the media.

Each of the five media levels and the top level have 2 sets of lifting handles 180 on opposites sides. These handles are also used to climb the biofilter for access to the top hatch. Connectors, for example, clasping hinges 182 or threaded connecting rods are used to keep the biofilter intact during transport. The hinges lock each level together and the connecting rods produce a downward force on the entire unit. The weight of the media on each support plate, which can exceed 750 lb. per level, is supported, in part, by the outer reinforcing ring of each level of the biofilter A series of 1 in. diameter aluminum posts between the centers of each level and the bottom of the biofilter provides additional support. The outer reinforcing ring is formed with a 3/16 in. by 2 in. aluminum bar. The levels lock together by a male-type ring on the bottom of each level which inserts into a female-type ring on the top of each level. A gasoline resistant rubber gasket is inserted into the female-type ring to provide an air-tight seal. The weight of the media locks the levels in place and prevents shifting. All aluminum connections are welded in place. Screws or bolts are not used.

In a preferred embodiment, the biofilter is constructed almost entirely from non-metal components such as fiberglass. For example, fiberglass is used for the perforated support plate, the cover, the media containers, the bottom container, the supporting framework, the connecting plates and the support posts. Sealing rings are preferably rubber gaskets. The fiberglass components are riveted together and thus are more readily disassembled to replace damaged or corroded parts. This is especially advantageous for replacing the perforated support plate. In a fiberglass biofilter the support plate can be constructed from other materials, for example, plastics such as polyethylene and metals such as stainless steel and aluminum. Such support plates can be riveted to the fiberglass frame and thus are readily replaced when damaged or corroded. The fiberglass biofilter is readily insulated by inserting a layer of insulation between the layers of the fiberglass. Such fiberglass biofilters are lighter and readily transported.

In a preferred embodiment of the apparatus 20 (FIG. 1) for removing VOC's from a contaminated air stream, contaminated air is discharged from the pressure side of a vacuum pump or similar extraction apparatus and travels through a 2 in. diameter or larger pipe 22 constructed of polyvinyl chloride, steel or similar material. The air enters the bottom side 24 of a 200 gallon or similar sized steel, high density plastic or aluminum tank 26 containing water 28 through a 2 in. welded coupling 30. Less than 1 ft. from the bottom of the tank the air must pass through a sheet of perforated aluminum 32 which is welded to the sides of the tank below the water level. The aluminum sheet is perforated with ⅛ in. holes on ¼ in. centers resulting in an open area of about 20 to 35%, preferably about 27%. This perforated sheet acts as a diffuser to break up the incoming air into finer bubbles. This technique was chosen because it results in minimal back pressure on the vacuum pump, provides the diffusion needed for humidification of dry air to 100% relative humidity, and is easy to clean with a pressure washer to remove chemical precipitates and/or other deposits commonly encountered in ground water. The humidified air exits the top of the tank through a 2 in. welded coupling 34 which is located at the opposite end from the entrance port.

The water supply to the tank is through a pressure water line 36 connected to a solenoid valve 38 located at the half way point of one side of the tank. The water source can be ground water, surface water or supplied water. Prior to entering the solenoid valve the water is passed through a cartridge type filter housing 40 containing either a sediment or carbon filter cartridge to remove particulate matter and/or chlorine. The water level in the tank is regulated by a conductivity sensor 42 located in an external one-in. PVC pipe 44 in the vertical position connected to the tank through one half-in. ports near the top and bottom. Liquid level controls external to the tank are used because the turbulence in the tank interferes with the sensors ability to correctly determine the water level and the sensor is easily accessible for cleaning to remove chemical precipitates and/or other deposits. The position of the sensor can be moved to control the water level in the tank. When water touches the sensor a signal is sent via a relay to close the solenoid valve. A signal delay up to 30 seconds is built into the controls to prevent constant opening and closing of the solenoid valve.

The humidified air enters the top level of the biofilter 50 through a 4 in. welded coupling 52 on the side and flows downward through the five media levels. The pipe 54 from the humidifier to the biofilter is 2 or 4 in. PVC, steel or similar material. A 2.5 hp regenerative vacuum pump 60 draws a vacuum of 20 to 25 inches of water column (w.c.) on the bottom level of the biofilter through a pipe 62. This maintains a 5 in. w.c. or less vacuum on the pipe 54 leading into the biofilter which results in even flow distribution through the five media levels. Keeping a vacuum on the biofilter also prevents excessive back pressure on the system producing the air stream. It is preferable to move the air stream by vacuum rather than by a pressurized blower system which tends to compact the media and create back pressure. The purified air stream is exhausted through a pipe 64 and discharged into the atmosphere. Air couplers and a ½ hp vacuum pump are used to draw air samples from the pre- and post-biofilter vacuum lines for gas analysis. Plugged sample ports on the pre-humidifier and pre- and post-biofilter lines are used to measure humidity, temperature and air velocity in the pipes.

The bioremediation apparatus of the invention for the biological oxidation of volatile organic compounds (VOC's) in air streams generated from the extraction of hydrocarbon vapors from the vadose zone, operates by preconditioning the air stream to optimal temperature and humidity in a humidification vessel; passing the contaminated air stream under vacuum through a biologically active media; adsorption of VOC's onto the biologically active media; oxidation of VOC's into carbon dioxide and water by the activity of microorganisms; and the growth and maintenance of microorganisms resulting from the biological oxidation of VOC's. The apparatus is constructed of a material and arranged in a configuration to be portable and durable; can be insulated for outdoor operation or contained in a building or mobile enclosure; has easy access for monitoring and maintenance; is aligned in a configuration of levels to isolate layers of media and encourage the homogenous and downward movement of fluids; and having the bottom of each media level constructed of a perforated material to retain media and allow the passage of fluids with minimal resistance. The humidifier is designed to humidify dry air to 100% relative humidity and decrease the temperature of hot air to less than 40° C. at air flow rates as high as 200 cubic feet per minute (cfm). The humidifier has external liquid level controls to maintain a set water level in the unit regardless of turbulence, is treated with a material to resist degradation, has a prefilter to remove sediment and/or chlorine, contains a perforated plate to diffuse the air flow without causing excessive back pressure, and has easy access for cleaning of both the liquid level sensor and the perforated plate. Vacuum is maintained on the system by a regenerative blower with varying flow and vacuum capabilities While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A bioremediation apparatus for removing contaminants from an airstream by passing the airstream through a layer of bioactive media, comprising:

a container;

a bioactive media within the container;

a perforated support plate within the container for supporting a layer of the bioactive media;

a multiplicity of holes substantially uniformly spaced over the entire area of the support plate, the holes having a maximum diameter sufficiently small to prevent significant amounts of the bioactive media from passing there through and a minimum diameter sufficiently large to prevent clogging, the spacing between adjacent holes being selected to produce an overall ratio of total hole area to total plate area of between from about 20% to about 35%; and a pump fluidly connected to the container for maintaining an airstream flow through the container.

2. The apparatus of claim 1, having an airstream flow rate of Q cu. ft./min. and an airstream velocity of VEL ft./min. in which the surface area of the plate is at least about Q/VEL sq. ft.

3. The apparatus of claim 2, having an airstream flow rate of about 200 cu. ft./min.

4. The apparatus of claim 3, in which the volume of bioactive media is about 100 cu. ft.

5. The apparatus of claim 2, in which the volume of bioactive media is at least about Q/2 cu. ft.

6. The apparatus of claim 2, in which the apparatus is cylindrical and the perforated plate has a diameter of at least about $0.357 \times Q^{0.5}$ ft.

7. The apparatus of claim 2, in which the container is cylindrical with a diameter of D ft and the height of the media is at least about $2Q/\pi D^2$ ft.

8. The apparatus of claim 2, in which the multiplicity of holes are circular of approximately 0.125 in. diameter on 0.25 in. centers.

9. The apparatus of claim 1, comprising a plurality of containers stacked one upon another, each container having a layer of the bioactive media sufficiently thin to substantially prevent compaction of the material during use.

10. The apparatus of claim 9, having an airstream flow rate of Q cu. ft./min. and an airstream velocity of VEL ft./min. in which the surface area of the plate is at least about Q/VEL sq. ft.

11. The apparatus of claim 10 comprising five perforated support plates each plate supporting a volume of bioactive media of at least about Q/10 cu. ft.

12. The apparatus of claim 11, in which the container is cylindrical with a diameter of D ft and the height of the media on each plate is at least about $0.4Q/\pi D^2$ ft.

13. The apparatus of claim 1, in which the container further comprises:

upper and lower chambers separated by the perforated support plate, the support plate having a center opening there through a side wall surrounding the upper and lower chambers;

a connecting plate below the opening; and a framework of interconnected bars attached between the lower chamber side wall, the support plate and the connecting plate for reinforcing the support plate;

wherein the depth of the framework of the media container creates a void space below the support plate.

14. The apparatus of claim 13, in which the framework of the container further comprises a plurality of spoke bars extending radially from the center opening of the support plate to the lower chamber wall, and a plurality of rib bars disposed between the center opening and the lower chamber wall for interconnecting adjacent spoke bars, wherein each spoke bar is connected to the connecting plate.

15. The apparatus of claim 14, comprising a plurality of containers.

16. The apparatus of claim 13, further comprising a layer of insulating material over an exterior surface of the container.

17. The apparatus of claim 13, in which the apparatus is constructed from materials selected from a group consisting of aluminum, stainless steel , fiberglass and high density plastic.

18. The apparatus of claim 17, in which the container further comprises a layer of insulation between layers of fiberglass.

19. The apparatus of claim 13, in which the perforated plate is riveted to the framework.

20. The apparatus according to claim 1, in which the container has a generally cylindrical configuration.

21. The apparatus according to claim 1, in which the bioactive media comprises a compost produced from municipal waste, wood chips, bark or leaves.

22. The apparatus of claim 21, in which the bioactive media further comprises a chemical buffer.

23. A The apparatus of claim 22, in which the buffer comprises limestone.

24. The apparatus of claim 1, in which the bioactive media comprises from about 40% to about 60% by weight of water.

25. The apparatus of claim 1, further comprising a humidification tank connected to the apparatus for humidifying the contaminated airstream prior to contacting the bioactive media.

26. The apparatus according to claim 1, in which the perforated support plate is removable.

27. The apparatus according to claim 1, in which the multiplicity of holes are equidistantly spaced over the entire area of the support plate.

* * * * *